United States Patent
Pfeiffer et al.

(10) Patent No.: US 12,461,241 B1
(45) Date of Patent: Nov. 4, 2025

(54) OBJECT DETECTION SOFT CONSISTENCY CHECKER

(71) Applicant: Zoox, Inc., Foster City, CA (US)

(72) Inventors: David Pfeiffer, Foster City, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 294 days.

(21) Appl. No.: 17/661,075

(22) Filed: Apr. 28, 2022

(51) Int. Cl.
   *G01S 17/931* (2020.01)
   *G06N 20/00* (2019.01)
   *G06V 20/58* (2022.01)

(52) U.S. Cl.
   CPC ............ *G01S 17/931* (2020.01); *G06N 20/00* (2019.01); *G06V 20/58* (2022.01)

(58) Field of Classification Search
   CPC ....... G01S 17/931; G06N 20/00; G06V 20/58
   See application file for complete search history.

(56) References Cited

U.S. PATENT DOCUMENTS

| | | | |
|---|---|---|---|
| 9,576,185 B1* | 2/2017 | Delp | G05D 1/0251 |
| 10,921,817 B1* | 2/2021 | Kangaspunta | G01S 7/4802 |
| 10,936,902 B1* | 3/2021 | Bagwell | G06T 7/73 |
| 2018/0033160 A1* | 2/2018 | Ishigami | G01C 15/00 |
| 2019/0020670 A1* | 1/2019 | Brabec | G06N 20/00 |
| 2019/0163191 A1* | 5/2019 | Sorin | G05D 1/0088 |
| 2019/0257947 A1* | 8/2019 | Zhang | G01S 17/931 |
| 2020/0309923 A1* | 10/2020 | Bhaskaran | G01S 17/87 |
| 2021/0048516 A1* | 2/2021 | Rohatgi | G01S 7/497 |
| 2021/0263152 A1* | 8/2021 | Halder | G05D 1/0231 |
| 2021/0302583 A1* | 9/2021 | Agrawal | G06N 3/044 |
| 2021/0327128 A1* | 10/2021 | Yu | G06T 19/20 |
| 2021/0341606 A1* | 11/2021 | Greenberg | G01S 7/4861 |
| 2023/0095410 A1* | 3/2023 | Costea | G01S 7/4863 356/5.01 |

OTHER PUBLICATIONS

Leo Stanislas, "Airborne Particle Classification in LiDAR Point Clouds Using Deep Learning", 2021 (Year: 2021).*

\* cited by examiner

*Primary Examiner* — Faris S Almatrahi
*Assistant Examiner* — Moises Gasca Alva
(74) *Attorney, Agent, or Firm* — Lee & Hayes, P.C.

(57) ABSTRACT

Techniques for determining a probability that an object that has been appropriately labeled as a non-impeding object are disclosed. Non-impeding objects may be objects in an environment that do not substantially affect the operation of a vehicle in the environment, such as steam, fog, smoke, etc. A machine-learned model may classify such objects as non-impeding objects. The designation may be checked by using the lidar data and measurements associated with the lidar points associated with the object to determine a probability that the object is a non-impeding object. The lidar data may be aggregated within the individual voxels of a voxelized representation of the object for use in the probability determination.

20 Claims, 5 Drawing Sheets

OBJECT DETECTION SOFT CONSISTENCY CHECKER

BACKGROUND

Various systems and techniques are utilized to perform detection of objects, such as vehicles, pedestrians, and bicycles, in an environment. For example, autonomous vehicles may be configured with lidar systems that use lasers to emit pulses into an environment and sensors to detect pulses that are reflected back from surfaces of objects in the environment. Various properties of the reflected pulses can be measured to generate data representing the presence and various characteristics of objects in the environment. However, fine particulate matter, gases, and other objects that do not impede the travel of a vehicle may also reflect these pulses. For example, fog, smoke, exhaust, steam, dust, and other such vapors may reflect laser pulses. Pulses reflected off such a non-impeding object may produce a false positive indication of the existence of a solid surface at the location of the object, even though no solid object exists at the location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
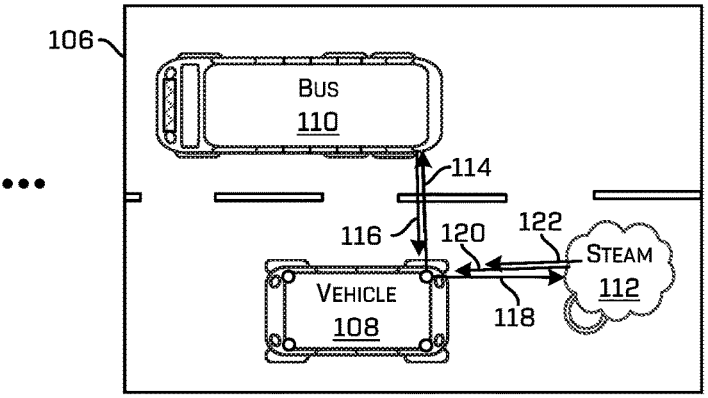
FIG. 1 is a pictorial flow diagram of an example process for determining a non-impeding object designation accuracy probability for use in object detection, in accordance with examples of the disclosure.
Figure 1:
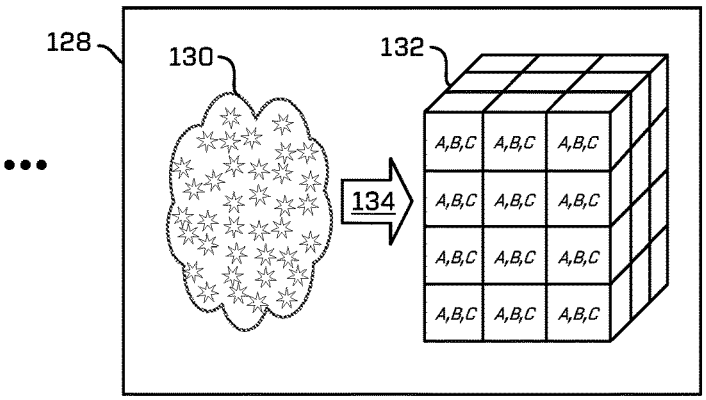

Techniques for improving non-impeding object detection discussed herein may include determining a probability that a candidate non-impeding object detection is associated with a non-impeding object or other object that does not impede the travel of a vehicle in an environment. As used herein, a surface may be associated with a non-impeding object in an environment. A non-impeding object may be an object that does not impede the motion of vehicle in the environment, such as an object composed of fine particulate matter (e.g., smoke, fog, steam, dust, etc.) or an object that is immaterial to vehicle progress (e.g., unused plastic bag, tumbleweed, leaves, etc.). Such objects may be detected by a sensor system and determined to be objects of particular types by a vehicle computing system (e.g., by a machine-learned model executed by the vehicle computing system using sensor data). When the vehicle computing system determines than an object is a non-impeding object, the vehicle computing system (e.g., a planning component of the vehicle computing system) may plan a trajectory that disregards that object because a non-impeding object will not impede the travel of a vehicle through an environment. However, a false positive identification of a solid or otherwise travel-impeding object as a non-impeding object may result in a hazardous vehicle trajectory. The techniques described herein may provide a check of the consistency of non-impeding object determinations, ensuring that objects deemed to be non-impeding object are legitimately non-impeding objects.

In various examples, sensor system may be configured at a vehicle that includes one or more emitters and one or more sensors. For example, a lidar system may be configured at a vehicle that includes one or more lidar emitters and one or more lidar sensors. The lidar system may emit lidar pulses into an environment and receive return pulses at the one or more lidar sensors that have been reflected by various objects in the environment into which the lidar pulses were emitted. The lidar system and/or a vehicle computing system configured at the vehicle may detect objects in the environment using these return pulse(s). As part of the detection process, a vehicle computing system may determine (e.g., using a machine-learned model) that an object detected in the environment is a candidate non-impeding object and may label the object as a non-impeding object. The vehicle computing system may use the lidar data associated with the candidate non-impeding object to perform a lidar non-impeding object detection consistency check. Based on the non-impeding object detection consistency check operations described herein, the vehicle computing system may determine that the candidate non-impeding object is likely a non-impeding object and may then determine a vehicle trajectory that treats the object as a non-impeding object by disregarding the object when planning a vehicle trajectory or adjusting a vehicle trajectory based on the object being a non-impeding object (e.g., slowing down rather than stopping). Additionally or alternatively, based on the disclosed lidar non-impeding object detection consistency check operations, the vehicle computing system may determine that the candidate non-impeding object is likely not a non-impeding object (e.g., is instead a solid object) and may then override the initial non-impeding object labeling of the associated object and determine a vehicle trajectory that treats the candidate non-impeding object as a solid object or some other type of object having one or more solid surfaces.

In examples, a machine-learned or other model may be used to detect, segment, or classify sensor returns for a particular object. Machine-learned models may inadvertently include sensor returns that indicate a non-impeding object as an impeding object. The disclosed techniques may be used to remove these inadvertently or incorrectly included returns and reclassify them as non-impeding objects through the use of several empirical properties of the sensor returns. These techniques can be used to augment a primary detection component to improve the accuracy of detections and mitigate risks with an autonomous vehicle's movement from being inadvertently impeded.

In various examples, a vehicle computing system may use one or more of various types and quantities of lidar data to determine a probability that a candidate non-impeding object is a non-impeding object. For example, the vehicle computing system may use data associated with the one or more lidar points that are associated with a candidate non-impeding object. Individual such lidar points may be associated with a return lidar pulse and may have associated lidar data that is collected and/or generated by a lidar system and/or a vehicle computing system. In various examples, a lidar intensity may be used in the disclosed lidar non-impeding object probability determination. For example, the intensity associated with the individual lidar return pulses associated with lidar points of a candidate non-impeding object may be detected by a lidar system and used to determine a probability that the non-impeding object has been properly designated as a non-impeding object. In various examples, lidar point data associated with multiple return (multipath) lidar pulses may also, or instead, be used to determine a probability that the non-impeding object has been properly designated as a non-impeding object or otherwise associated with a non-impeding detection. Multiple return lidar pulses may be reflections of a single emitted lidar pulse. For example, a single emitted lidar pulse may result in two or more return pulses when the emitted pulse partially reflects from more than one surface in an environment. These two or more return pulses may be detected by the lidar system and may have associated return pulse characteristics and data that may differ in one or more respects. Differences between the return pulse data for individual return pulses associated with a single emitted pulse may be used in non-impeding object probability operations. For example, an initially emitted lidar pulse may result in two return lidar pulses (and associated lidar points) when the initial lidar pulse partially reflects off two distinct surfaces in an environment. A first return pulse that was reflected off a first surface of an object may be detected by a lidar sensor at a first length of time following the emission of the initial lidar pulse (a first propagation time), while a second return pulse that was reflected off a second surface of the object may be detected by the lidar sensor at a second length of time following the emission of the initial lidar pulse (a second propagation time). The difference between the first propagation time and the second propagation time may be used in the disclosed operations to determine a probability that the object is a non-impeding object. Alternatively, or in addition, a first return pulse that was reflected off a first surface of the object may be determined to indicate a first distance from the lidar system to the first surface and/or the object, while a second return pulse that was reflected off a second surface of the object may be determined to indicate a second distance from the lidar system to the second surface and/or the object. The difference between the first distance and the second distance may be used in the disclosed operations to determine a probability that the object is a non-impeding object. In other examples, other differences between one or more other measurements and/or data associated with multiple return pulses may be used in one or more non-impeding object probability operations. In examples, radar multipath determinations may be made using a radar system (e.g., radar emitters and sensors), radar pulses, and/or associated data as well as, or instead of, lidar multipath determinations made using a lidar system, lidar pulses, and/or associated data.

In an example, an initially emitted pulse may result in multiple return pulses that individually reflected off one or more particles in multiple distinct portions of a non-impeding object composed of particulate matter. Because the non-impeding object may be composed of relatively widely distributed particles, these multiple portions may be relatively distant from one another, resulting in the multiple return pulses having relatively significantly different propagation times and/or associated object distances. In another example, an initially emitted pulse may result in multiple return pulses that reflected off multiple surfaces of a solid object. Because the object is a solid object, these multiple surfaces may be relatively close to one another, resulting in the multiple return pulses having relatively similar propagation times and/or determined object distances. The differences between such propagation times and/or associated object distances of such return pulses in these examples may be used in one or more non-impeding object probability operations as described herein.

In various examples, return pulse data and/or lidar point data may also, or instead, be used to determine object detection data that may be used to determine a probability that the non-impeding object has been properly designated as a non-impeding object or non-impeding detection. For example, a vehicle computing system may determine, based on one or more return lidar pulses, a probability that an object associated with the surface off which the return lidar pulses reflected is in motion. The probability that an object may be in motion may be referred to as an "estimated static probability" and may be determined for individual lidar points. If the estimated static probability for a particular lidar point is relatively high (e.g., approaching 1), the object associated with that lidar point is more likely to be static (e.g. not in motion) than if the estimated static probability is relatively low (e.g., approaching 0). In another example, a vehicle computing system may determine, based on one or more return lidar pulses, a probability that an object associated with the surface off which the return lidar pulses reflected is occluded. An estimated static probability and/or occlusion probability for one or more lidar points and/or any other determined data for such points may be used in one or more non-impeding object probability operations as described herein.

Alternatively or in addition, multiple lidar return pulses and/or data based thereon may be used to determine a motion status of an object. For example, a vehicle computing system may determine the variability of the measured distances to an object over time using multiple return lidar pulses. The vehicle computing system may determine that if the distance to an object determined based on two or more return lidar pulses varies (e.g., sufficiently) over time, the object may be more likely to be in motion. An object motion probability determined based on one or more lidar return pulses and/or any other determined data for such return pulses may be used in one or more non-impeding object probability operations as described herein.

In various examples, instead of, or in addition to, using individual lidar point data associated with individual return pulses (e.g., "raw" data), individual lidar point data may be aggregated with other individual lidar point data based on an associated location of the points in (e.g., three-dimensional) space. For example, a portion of the three-dimensional space in an environment may be "voxelized" by uniformly dividing the space into three-dimensional cubes ("voxels") representing sections of that portion of the space. The data associated with the individual lidar points within individual voxels may be aggregated to generate single data values for such individual voxels that may then be used in the one or more non-impeding object probability operations as described herein. This aggregated lidar point data may be referred to as "voxelized lidar point data." As will be appreciated, the number of lidar points in a particular section of an environment may vary widely depending on the proximity of the lidar system and other factors. By voxelizing the space, a more accurate representation of data associated with the object within the voxelized space may be realized because there may be a consistent number of data values for individual data types (e.g., one per voxel per data type) instead of a widely variable number of data values for individual data types (e.g., one per lidar point per data type) that may affect the accuracy of the probability determinations described herein.

For example, a particular voxel may represent a section of an environment containing at least a portion of an object and may include multiple lidar points. These lidar points may be associated with multiple return pulses that reflected off one or more surfaces of the portion of the object located within the section of the environment represented by the voxel. A vehicle computing system may determine values for one or more types of lidar data of the individual lidar points and aggregate such values to determine a single value for particular types of lidar data. These aggregated lidar data values may be used in the one or more non-impeding object probability operations as described herein.

In an example, a vehicle computing system may determine a lidar intensity for individual lidar points in a particular voxel associated with multiple lidar points. The vehicle computing system may then average these intensity values to determine an aggregated intensity value for the voxel. Alternatively, or instead, the vehicle computing system may perform one or more other operations to determine an aggregated intensity value for the voxel. For example, the vehicle computing system may determine a minimum intensity value from among the intensity values associated with a particular voxel and use that minimum intensity value as the aggregated intensity value for that voxel (minimization). In another example, the vehicle computing system may determine a maximum intensity value from among the intensity values associated with a particular voxel and use that maximum intensity value as the aggregated intensity value for that voxel (maximization). The vehicle computing system may use this aggregated voxel intensity value (e.g., along with aggregated intensity values associated with other voxels) in one or more non-impeding object probability operations as described herein.

In an example, a vehicle computing system may determine multiple return differences for multiple sets of multiple return lidar points in a particular voxel associated with multiple lidar points. The vehicle computing system may then average these multiple return differences to determine an aggregated multiple return difference for the voxel. Alternatively, or in addition, the vehicle computing system may perform one or more other operations to determine an aggregated multiple return difference for the voxel (e.g., minimization, maximization, etc.). The vehicle computing system may use this aggregated multiple return difference (e.g., along with aggregated multiple return differences associated with other voxels) in one or more non-impeding object probability operations as described herein.

In an example, a vehicle computing system may determine other data based on data associated with individual lidar points in a particular voxel associated with multiple lidar points and aggregate the determined data for use in one or more non-impeding object probability operations. For example, a vehicle computing system may determine an estimated static probability value for individual lidar points in a particular voxel associated with multiple lidar points. The vehicle computing system may then average these estimated static probability values to determine an aggregated estimated static probability value for the voxel. Alternatively, the vehicle computing system may perform one or more other operations to determine an aggregated estimated static probability value for the voxel. The vehicle computing system may use this aggregated estimated static probability value (e.g., along with aggregated estimated static probability values associated with other voxels) in one or more non-impeding object probability operations as described herein.

In various examples, the data described above may be used to determine the probability that an object initially determined to be a non-impeding object is a non-impeding object rather than a solid object. The data used to determine this probability may be referred to as "evidence." As noted, this evidence may include, for individual lidar points and/or for individual voxels, lidar intensity, multiple return difference, estimated static probability, and/or other types of data. Such other data may include radar data, color data, infrared data, sonic data, temperature data, and/or any other data that may be detected and/or determined for surface and/or object in an environment.

In various examples, a Bayesian probabilistic fusion of various types of evidence, such as those described herein, may be used to determine a non-impeding object probability. For example, a Bayesian inference function may be used to derive the posterior probability that an object labeled as a non-impeding object is a non-impeding object. A probability p that an object designated as a non-impeding object is a non-impeding object may be determined using a natural logarithmic function, such as the posterior log odds ratio of the probability of a non-impeding object probability given a set of evidence illustrated by equations (1) below:

$$\ln \frac{p(d=1|E)}{p(d=0|E)} = \tag{1}$$

$$\frac{p(d=1|E)/p(E)}{p(d=0|E)/p(E)} = \ln \frac{p(d=1,E)}{p(d=0,E)} = \ln \frac{p(E|d=1)p(d=1)}{p(E|d=0)p(d=0)} =$$

$$\ln \frac{\prod_i p(e_i|d=1)p(d=1)}{\prod_i p(e_i|d=0)p(d=0)} = \ln \frac{p(d=1)}{p(d=0)} = \sum_i \frac{\ln p(e_i|d=1)}{p(e_i|d=0)}$$

In equations (1), d may be a binary random variable that indicates whether a set of lidar data is associated with a non-impeding object (d=1) or not (d=0). E may be a vector random variable that represents a vector of discrete random variables $e_i$ for each type of evidence that is being used in the non-impeding object probability operations. This derivation may make the naïve Bayes assumption that the various pieces of data that make up the evidence used in the function are conditionally independent.

Because an individual piece of evidence may be associated with a lidar point (e.g., an individual lidar point or a voxelized lidar point), and because an individual lidar point may be associated with multiple pieces of evidence (e.g., lidar intensity, multiple return difference, estimated static probability), the evidence vector E described above may be further partitioned into groups of evidence of a same type over all such points, for example by a function illustrated as equations (2) below:

$$\ln\frac{p(d=1|E)}{p(d=0|E)} = \quad (2)$$

$$\ln\frac{p(E|d=1)p(d=1)}{p(E|d=0)p(d=0)} = \ln\frac{\prod_i p(r_i|d=1)\prod_i p(s_i|d=1)p(d=1)}{\prod_i p(r_i|d=0)\prod_i p(s_i|d=0)p(d=0)} =$$

$$\ln\frac{p(d=1)}{p(d=0)} + \sum_i \ln\frac{p(r_i|d=1)}{p(r_i|d=0)} + \sum_i \ln\frac{p(s_i|d=1)}{p(s_i|d=0)}$$

In equations (2), specific types of (e.g., voxelized) lidar point data may be indicated. For example, r may indicate lidar intensity and s may indicate multiple return difference, while i indicates a particular lidar point in the range of (e.g., voxelized) lidar points associated with the candidate non-impeding object. By voxelizing lidar points and aggregating associated lidar point data as described herein, a summary of the lidar point data for lidar points in individual voxels may be used rather than "raw" data associated with the individual points. Using individual point data may require more computationally intensive processes because probabilities for each point may be determined individually (e.g., wherein each point contributes a conditional or otherwise contributory probably to other points that may be collocated). Summarized or aggregated data for points within voxels as described herein may instead be used to determine conditional probabilities more efficiently and may therefore more efficiently determine one or more probabilities that an object classified as a non-impeding object is a non-impeding object by aggregating probabilities for voxels (with data points contained therein) instead of individual data points directly. By aggregating the data points to voxels, an assumption regarding independence of the data points contribution to the probabilities can be made, simplifying calculations.

The systems and techniques described herein may be directed to leveraging measurements of returned lidar pulses and associated data to improve object detection used by a vehicle, such as an autonomous vehicle, in an environment. More specifically, the disclosed systems and techniques may be directed to facilitating more accurate detection of non-impeding objects and reducing false designations of solid or otherwise travel-impeding objects as non-impeding objects. Using this improved data, such a vehicle may generate safer and more efficient trajectories for use in navigating through an environment. In particular examples, the systems and techniques described herein can utilize data structures containing object detection data based on the disclosed voxelization of lidar point data, returned lidar pulses, and associated data to more accurately and efficiently determine whether objects in an environment are non-impeding objects. By using the lidar point analysis and voxelization techniques described herein to more accurately distinguish between solid objects that may present a hazard to an autonomous vehicle and non-impeding objects that may be safely disregarded, the examples described herein may result in increased certainty and accuracy object detections, thereby allowing an autonomous vehicle to generate more accurate and/or safer trajectories for the autonomous vehicle to traverse in the environment.

For example, techniques described herein may increase the reliability of the determination of the solidity of objects in the environment, reducing the likelihood of inaccurately designating an object as a non-impeding object or a solid object. That is, the techniques described herein provide a technological improvement over existing object detection, classification, tracking, and/or navigation technology. In addition to improving the accuracy of object detections and classifications of such objects, the systems and techniques described herein can provide a smoother ride and improve safety outcomes by, for example, more accurately providing safe passage to an intended destination through an environment that is also occupied by one or more objects that may include non-impeding objects.

The techniques described herein may also improve the operation of computing systems and increase resource utilization efficiency. For example, computing systems, such as vehicle computing systems, may more efficiently perform non-impeding object determinations using the techniques described herein because, by voxelizing lidar points associated with a candidate non-impeding object, the disclosed examples may reduce the amount of data and data processing required to determine a non-impeding object probability while increasing the accuracy of such a determination, thereby increasing the efficiency and accurate of non-impeding object determinations over what would be possible using conventional techniques. Moreover, the techniques discussed herein may reduce the amount of data used by computing systems to determine a trajectory for controlling a vehicle, which may reduce latency, memory usage, power, time, and/or computing cycles to determine the trajectory.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of pulses originating as lidar emissions, detection using lidar sensors, and processing using lidar sensor and lidar point data, other types of sensors and emitters are contemplated, as well as other types of sensor data. Furthermore, the disclosed systems and techniques may include using various types of components and various types of data and data structures, including, but not limited to, various types of image data and/or sensor data (e.g., stereo cameras, time-of-flight data, radar data, sonar data, and the like). For example, the techniques may be applied to any such sensor systems. Additionally, the techniques described herein can be used with real data (e.g., captured using sensor(s)), simulated data (e.g., generated by a simulator), or any combination of the two.

FIG. 1 is a pictorial flow diagram of an example process 100 for determining a probability that a candidate non-impeding object detected in an environment is accurately designated as a non-impeding object. In some examples, one or more operations of the process 100 may be implemented by a vehicle computing system, such as by using one or more of the components and systems illustrated in FIGS. 2-6 and described below. For example, one or more components and systems can include those associated with one or more of the one or more sensor systems 204, 304, 402, 504, and 606, one or more of the perception components 216, 316, and 622, and/or one or more of the planning components 218, 318, and 628. In some examples, the one or more operations of the process 100 may also, or instead, be performed by a remote system in communication with a vehicle, such as the perception component 644 of the computing device(s) 638 illustrated in FIG. 6. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 2-6 are not limited to performing the process 100.

At operation 102, a sensor system configured at or otherwise associated with an autonomous vehicle may emit a signal into an environment. In particular examples, this sensor system may include a lidar system that includes one or more lidar emitters and one or more lidar sensors (e.g., photodetectors). At operation 102, such a lidar system may emit one or more lidar pulses into the environment in which the autonomous vehicle is operating. Such an environment may include one or more other objects that a vehicle computing system configured at the autonomous vehicle may detect. For example, a vehicle computing system configured at the autonomous vehicle may use one or more sensors of the sensor system to detect stationary object (e.g., buildings, road markings, signs) and moving objects (e.g., people, bicycles, other vehicles) in the environment. The vehicle computing system may be further configured to determine whether detected objects are solid or non-impeding (e.g., particulate matter such as smoke, fog, dust, steam, etc.). The vehicle computing system may classify, categorize, or otherwise designate non-impeding objects as non-impeding objects. As described herein, an initial designation of an object as a non-impeding object may be checked for consistency and may have its designation altered if the vehicle computing system determines that the object has likely been misclassified as a non-impeding object. For those objects determined to be likely accurately designated as non-impeding objects, the vehicle computing system may disregard them when planning a trajectory for the autonomous vehicle. While the examples used herein may refer to one or more lidar sensor systems (e.g., including one or more lidar emitters (e.g., lasers) and one or more lidar sensors (e.g., laser sensors)), in various other examples, other types of sensor systems using various other combinations of emitters and sensors may be used to implement the disclosed systems and techniques, such as camera sensors, radar emitters and sensors, sonar emitters and sensors, ultrasonic transducers, audio sensors, and/or any other suitable sensors and sensor systems.

At operation 104, one or more sensors (e.g., photodetectors) of the sensor system configured at the autonomous vehicle may receive one or more return lidar pulses that are the result of the reflection of the pulses initially emitted at operation 102. A return lidar pulse may be a reflection of an emitted lidar pulse off one or more surfaces in an environment. While ideally a return lidar pulse has reflected off one surface of one object, some types of objects may result in multiple return pulses for a single emitted pulse. For example, a non-impeding object composed of particulate matter may be partially permeable to a lidar pulse. Particles in various distinct portions of such an object may reflect an emitted lidar pulse, resulting in multiple return pulses that may be detected at the lidar system that originated the emitted lidar pulse.

An example 106 illustrates a top-down view of an environment that includes a vehicle 108 that may be operating in an environment that may also include one or more solid objects, such as a bus 110, and one or more non-impeding objects, such as steam 112 that may, for example, be rising from a manhole. The vehicle 108 may be configured with a lidar sensor system and a vehicle computing system that may be configured to emit lidar pulses and detect return lidar pulses.

The lidar sensor system of vehicle 108 may emit a lidar pulse 114 that may reflect from the bus 110 and may be detected by the lidar sensor system of vehicle 108 as a return lidar pulse 116. The lidar sensor system of vehicle 108 may emit a lidar pulse 118 that may reflect from the steam 112. Because the steam 112 may be a porous, non-impeding object, the emitted pulse 118 may reflect from more than one surface of the steam 112 (e.g., particles within the steam 112) and may therefore result in multiple return pulses 120 and 122 that may be detected by the lidar sensor system of vehicle 108 as a return lidar pulse 116.

At operation 124, the vehicle computing system may determine whether one or more objects detected based on the return lidar pulses received at operation 104 may be non-impeding object. In various examples, at operation 124, the vehicle computing system may execute a machine-learned model to perform object detection based on the return lidar pulses. Such a machine-learned model may be executed by a perception component of a vehicle computing system. As part of this object detection process, the vehicle computing system may determine a non-impeding object designation or non-impeding detection for one or more objects detected in the environment. This designation may be assigned by the machine-learned model executed by the vehicle computing system while performing object detection.

At operation 126, the vehicle computing system may voxelize lidar point data associated with an object designated as a non-impeding object at operation 124. For example, the vehicle computing system may determine the lidar points associated with a particular object that has been designated a non-impeding object. The vehicle computing system may determine a portion of the environment within which the object is located and determine the voxels for that portion of the environment. The vehicle computing system may then determine with which voxels in that portion of the environment the individual lidar points are associated. The vehicle computing system may then aggregate the data associated with the individual lidar point in individual voxels. If there are multiple types of lidar point data available for an individual lidar point or combination of lidar points (e.g., lidar intensity, multiple return distance difference, multiple return propagation time difference, estimated static probability), the vehicle computing system may determine an aggregate value for individual types of lidar point data for individual voxels. This aggregation may be an averaging function that averages a particular type of lidar point data within a voxel. In other examples, one or more other functions may also be used to determine an aggregate value for a particular type of lidar data associated with a particular voxel.

An example 128 illustrates an example set of lidar points 130 that may, for example, represent the lidar points associated with steam 112 of the example 106. Individual lidar points of the set of lidar points 130 may have one or more associated pieces of lidar data that may serve as non-impeding object evidence, such as a lidar intensity value and/or a multiple return distance difference. Individual lidar points of the set of lidar points 130 may also, or instead, be associated with one or more pieces of lidar data or non-impeding object evidence that is based on more than one lidar point (e.g., a difference between measurement or data for more than one lidar point), such as a multiple return difference value.

The lidar points 130 may be associated with particular voxels in a voxel data structure 132. A vehicle computing system may determine the voxels within the voxel data structure 132 with which individual points of the set of lidar points 130 may be associated. For the individual voxels in the voxel data structure 132, the vehicle computing system may perform an operation 134 to aggregate one or more types of lidar point data for individual lidar points of the set of lidar points 130 associated with that voxel to determine a single value for the individual types of lidar point data. For example, as shown in this example, the individual lidar points of lidar points 130 may have associated data or measurements of types a, b and c. The vehicle computing system may aggregate the data for these data types for the individual lidar points that are located in the voxels represented by the voxel data structure 132 to generate aggregated a, b, c for the individual voxels. This data may be used to determine the probability that the non-impeding object associated with the set of lidar points 130 has been correctly designated a non-impeding object.

At operation 136, the vehicle computing system may determine, using the voxelized lidar point data determined at operation 126, a probability that the non-impeding object has been accurately designated a non-impeding object. This determination may be made using the natural logarithm functions described above and/or other functions that may determine a probability using the voxelized lidar point data described herein. In various examples, this probability may be represented numerically as a number between zero and one, where zero represent the lowest probability that the non-impeding object has been accurately designated a non-impeding object and one represents the greatest probability that the non-impeding object has been accurately designated a non-impeding object.

At operation 138, the vehicle computing system may determine whether the probability determined at operation 136 is great enough to maintain the non-impeding object designation for the object initially designated as a non-impeding object. In various examples, this may be a threshold comparison. For example, the vehicle computing system may determine whether the determined probability meets or exceeds a threshold (e.g., 0.99, 0.995, 0.9995, etc.) and/or whether the natural log of the probability meets or exceeds a threshold (e.g., $-10^{-14}$, $-10^{-15}$, etc.). In various examples, the threshold may be relatively high to ensure that a non-impeding object designation is only maintained if there is a great probability that it is correct. In other examples, one or more other criteria may also, or instead, be used to determine whether the probability determined at operation 136 is great enough to maintain the non-impeding object designation for the object initially designated as a non-impeding object.

In various examples, probabilities for individual types of evidence or combinations of evidence may be considered, for example in conjunction with probabilities for other, distinct individual types of evidence or combinations of evidence. For example, a first probability that a non-impeding object has been accurately designated a non-impeding object may be determined based on voxelized and aggregated intensity data and compared to a first threshold while a second probability that a non-impeding object has been accurately designated a non-impeding object may be determined based on voxelized and aggregated estimated static probability data and compared to a second threshold. In such examples, if either probability fails to meet its respective threshold, the vehicle computing system may determine that the non-impeding object has not been accurately designated a non-impeding object and may reclassify the object accordingly (e.g., as solid).

In various examples, probabilities for individual types of evidence or combinations of evidence may be used in the determination of an overall probability of whether a non-impeding object has been accurately designated a non-impeding object. For example, a first probability determined based on voxelized and aggregated estimated static probability data, a second probability determined based on voxelized and aggregated occlusion probability data, and/or a third probability determined based on voxelized and aggregated intensity data may be used to determine an overall probability that a non-impeding object has been accurately designated a non-impeding object.

In various examples, rather than, or in addition to, using a particular type of measurement associated with points in a particular voxel to determine an aggregated value for that type of measurement for the voxel, a probability of the aggregated measurement indicating whether the object is a non-impeding object may be used. For example, a first conditional probability that an object is a non-impeding object based on the aggregated intensity and/or a second conditional probability that an object is a not a non-impeding object based on the aggregated intensity may be used to determine an overall probability that an object is a non-impeding object. These conditional probabilities may be determined for the individual voxels in a set of voxels associated with a candidate non-impeding object. The aggregated measurement values for the individual voxels may be compared to a look-up table that correlates measurement values and probabilities to determine a probability associated with the aggregated measurement value. This probability may then be determined as a conditional probability value for the associated voxel and measurement type. The probabilities in such a look-up table may be based on (e.g., human annotated) ground truth data that may be associated with determined probability distributions for impeding and/or non-impeding objects. These conditional probabilities may be used to determine a probability that an object is an impeding and/or non-impeding object, respectively.

If, at operation 138, the vehicle computing system determines that the probability determined at operation 136 is great enough to maintain the non-impeding object designation for the object initially designated as a non-impeding object, at operation 140, the vehicle computing system may output the probability and/or any related object data for use (or not) by one or more components of the vehicle computing system. For example, a planning component of the vehicle computing system may disregard the non-impeding object in determining trajectories for the vehicle. In examples, the vehicle computing system may take no action based on the determining that the probability is sufficient to maintain the non-impeding object designation and continue to use the data as received at operation 126 for perform vehicle functions and operations (e.g., determining a vehicle trajectory).

On the other hand, if, at operation 138, the vehicle computing system determines that the probability determined at operation 136 is not enough to maintain the non-impeding object designation for the object initially designated as a non-impeding object, at operation 142, the vehicle computing system may output the probability and/or any related object data for use (or not) by one or more components of the vehicle computing system. For example, the vehicle computing system may redesignate the object as a solid object (e.g., as a particular type of solid object) and/or otherwise consider the object to be solid at least for the purposes of determining trajectories for the vehicle. For example, the vehicle computing system may reclassify the object as a solid object (e.g., assign a classification that is not a non-impeding object classification to the object) and/or remove or otherwise disassociate the non-impeding object classification from the object. A planning component of the vehicle computing system may then include the formerly classified non-impeding object as a solid object in determining trajectories for the vehicle.

Figure 2A:
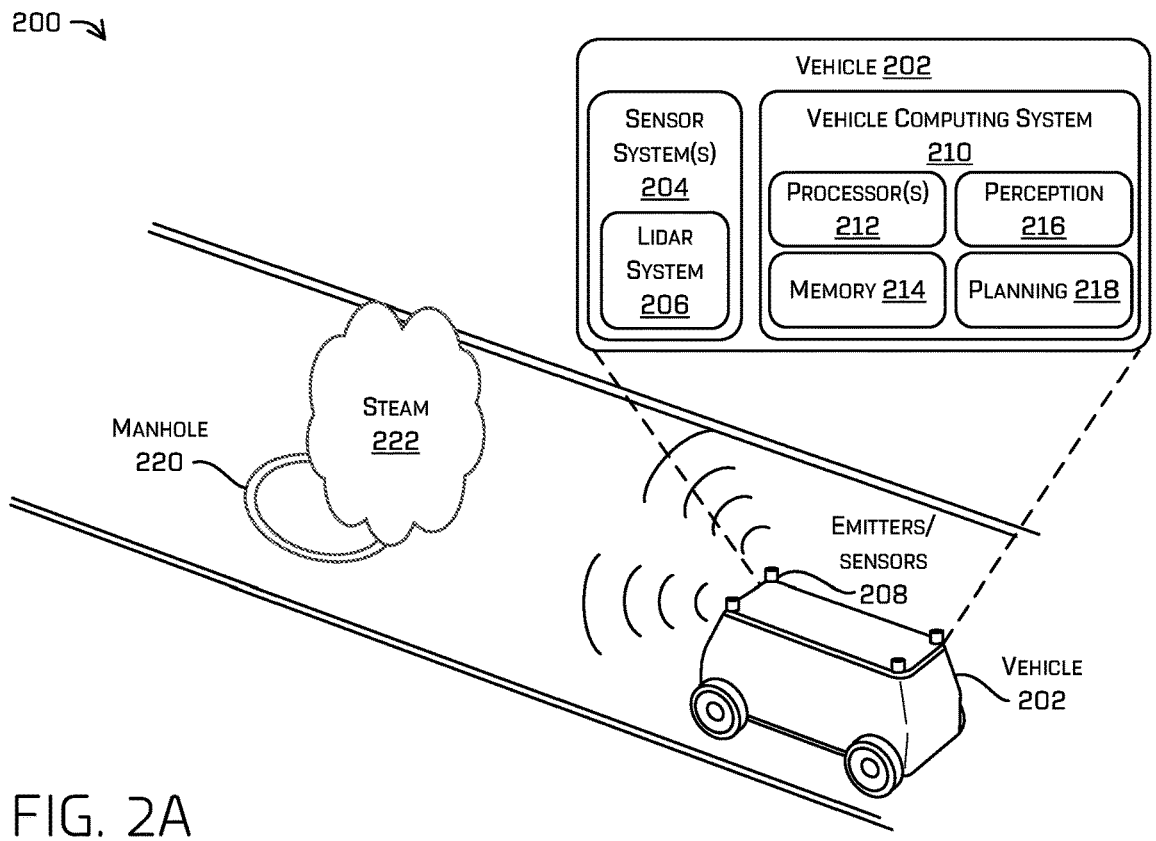
FIG. 2A is a diagram of an example environment in which a vehicle is detecting an object using lidar pulses in the environment, in accordance with examples of the disclosure.

FIG. 2A is a perspective view of an example environment 200 in which a vehicle 202 may be traveling. The vehicle 202 may be configured with a sensor system 204 that may include a lidar system 206. The lidar system 206 may include emitters/sensors 208 that may be configured to emit one or more lidar pulses into the environment 200 and detect one or more return lidar pulses resulting from reflections of the lidar pulses emitted into the environment 200. The vehicle 202 may further be configured with a vehicle computing system 210 that may include one or more processors 212, a memory 214, a perception component 216, and a planning component 218, any one or more of which may be used to perform one or more of the operations described herein.

The environment 200 may include objects, such as a manhole 220 that may be allowing the release of steam 222 into the environment 200. The steam 222 may be detected by the lidar system 206 and may be determined to be a non-impeding object, for example, by a machine-learned model executed by the vehicle computing system 210 and/or the perception component 216.

Figure 2B:
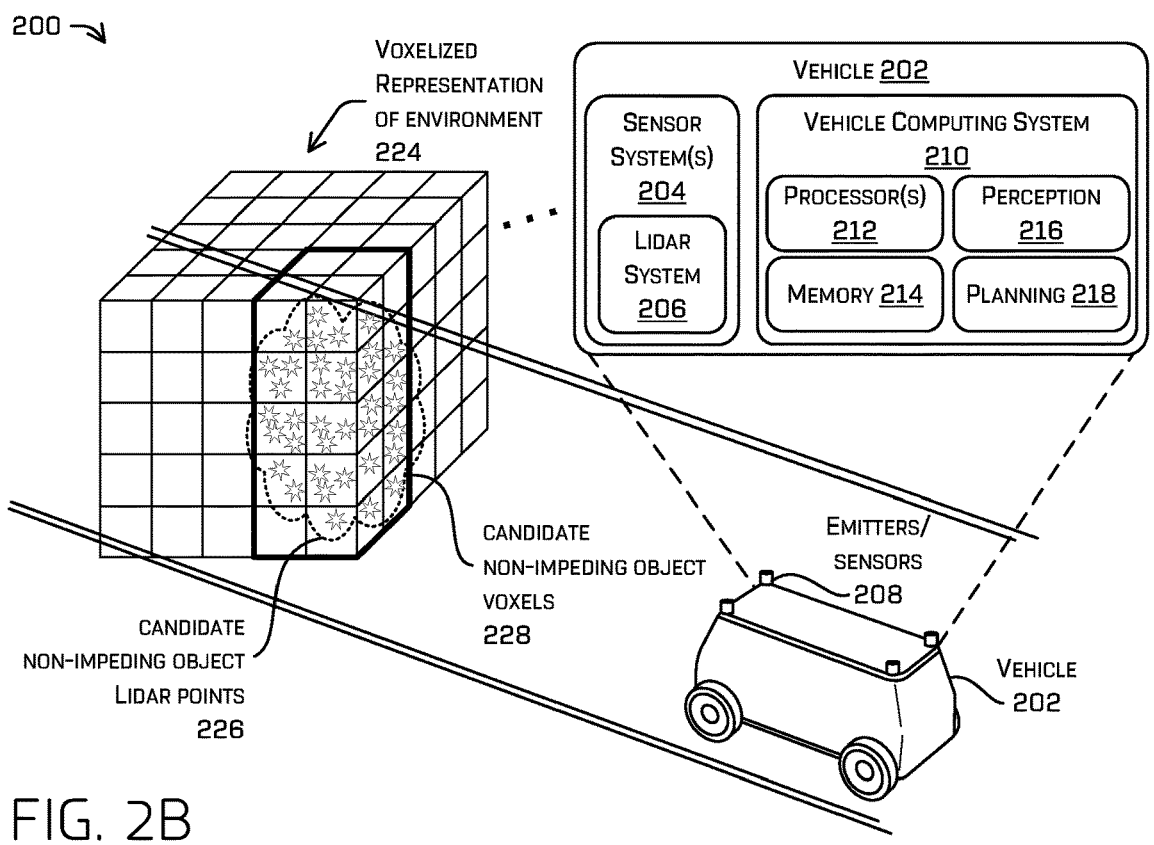
FIG. 2B is another diagram of the example environment of FIG. 2A in which the vehicle is determining voxelized lidar pulse data, in accordance with examples of the disclosure.

The vehicle computing system 210 (e.g., the perception component 216) may perform non-impeding object probability operations based on determining that the steam 222 may be a non-impeding object. Referring now to FIG. 2B, the vehicle computing system 210 may determine a voxelized representation 224 of the environment 200 and the lidar points 226 that may be associated with the non-impeding object (e.g., steam 222). The vehicle computing system 210 may then determine the individual lidar points of the candidate non-impeding object lidar points 226 that are associated with individual voxels of the voxelized representation 224 of the environment 200. The vehicle computing system 210 may determine the candidate non-impeding object voxels 228 that include one or more of the candidate non-impeding object lidar points 226.

For the individual voxels of the candidate non-impeding object voxels 228, the vehicle computing system 210 may determine a single aggregated value for the individual lidar data types associated with the candidate non-impeding object lidar points 226 in the individual candidate non-impeding object voxels 228. Using these aggregated values, the vehicle computing system 210 may determine the probability that the non-impeding object (e.g., steam 222) has been properly designated as a non-impeding object. For example, the vehicle computing system 210 may determine that the steam object 220 has a sufficient probability of being a non-impeding object to maintain the non-impeding object designation for this object, and therefore disregard the object 220 in determining a trajectory for the vehicle 202 (e.g., by the planning component 218).

Figure 3A:
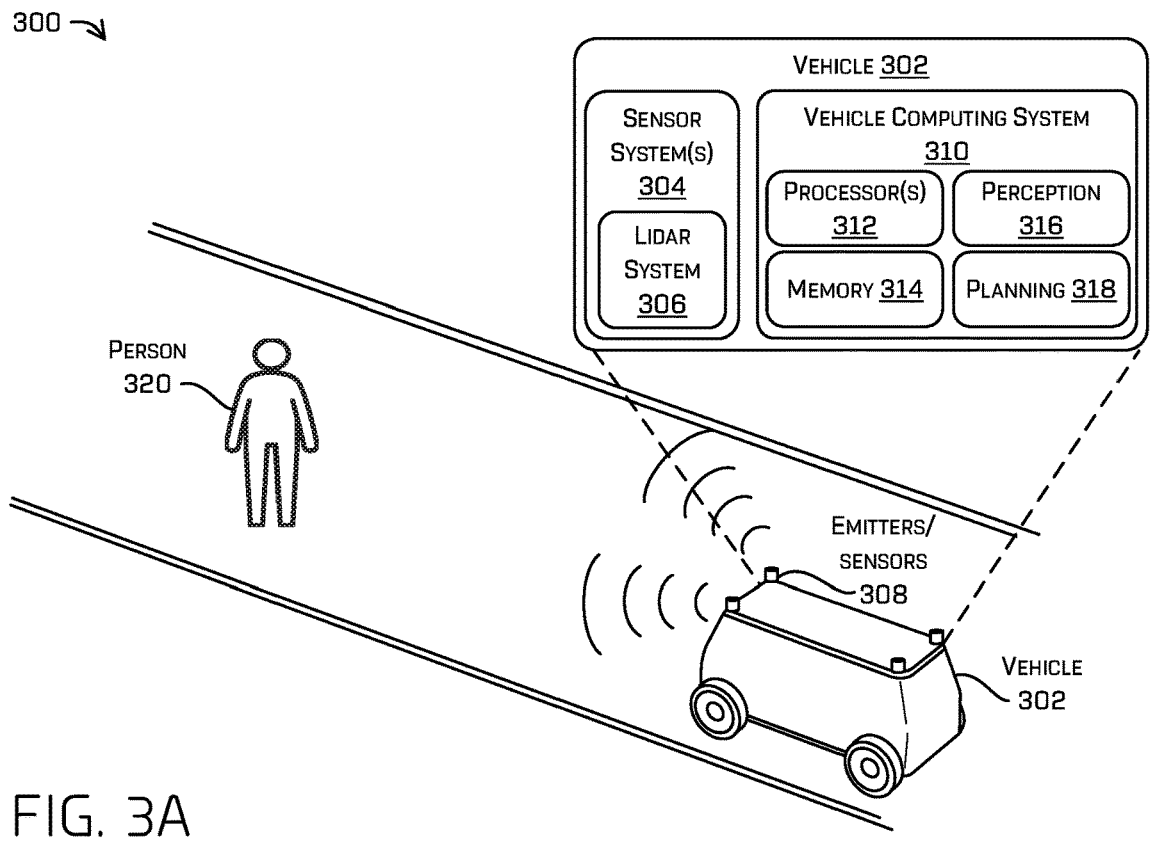
FIG. 3A is a diagram of an example environment in which a vehicle is detecting an object using lidar pulses in the environment, in accordance with examples of the disclosure.

FIG. 3A is a perspective view of an example environment 300 in which a vehicle 302 may be traveling. The vehicle 302 may be configured with a sensor system 304 that may include a lidar system 306. The lidar system 306 may include emitters/sensors 308 that may be configured to emit one or more lidar pulses into the environment 300 and detect one or more return lidar pulses resulting from reflections of the lidar pulses emitted into the environment 300. The vehicle 302 may further be configured with a vehicle computing system 310 that may include one or more processors 312, a memory 314, a perception component 316, and a planning component 318, any one or more of which may be used to perform one or more of the operations described herein.

The environment 300 may include objects, such as a person 320. The person 320 may be detected by the lidar system 306 and may be falsely determined to be a non-impeding object, for example, by a machine-learned model executed by the vehicle computing system 310 and/or the perception component 316. This false designation of a non-impeding object status to the person 320 may be due to environmental conditions (e.g., particular matter surrounding the person 320), sensor issues (e.g., dirty or defective lidar sensors), or other conditions that may arise.

Figure 3B:
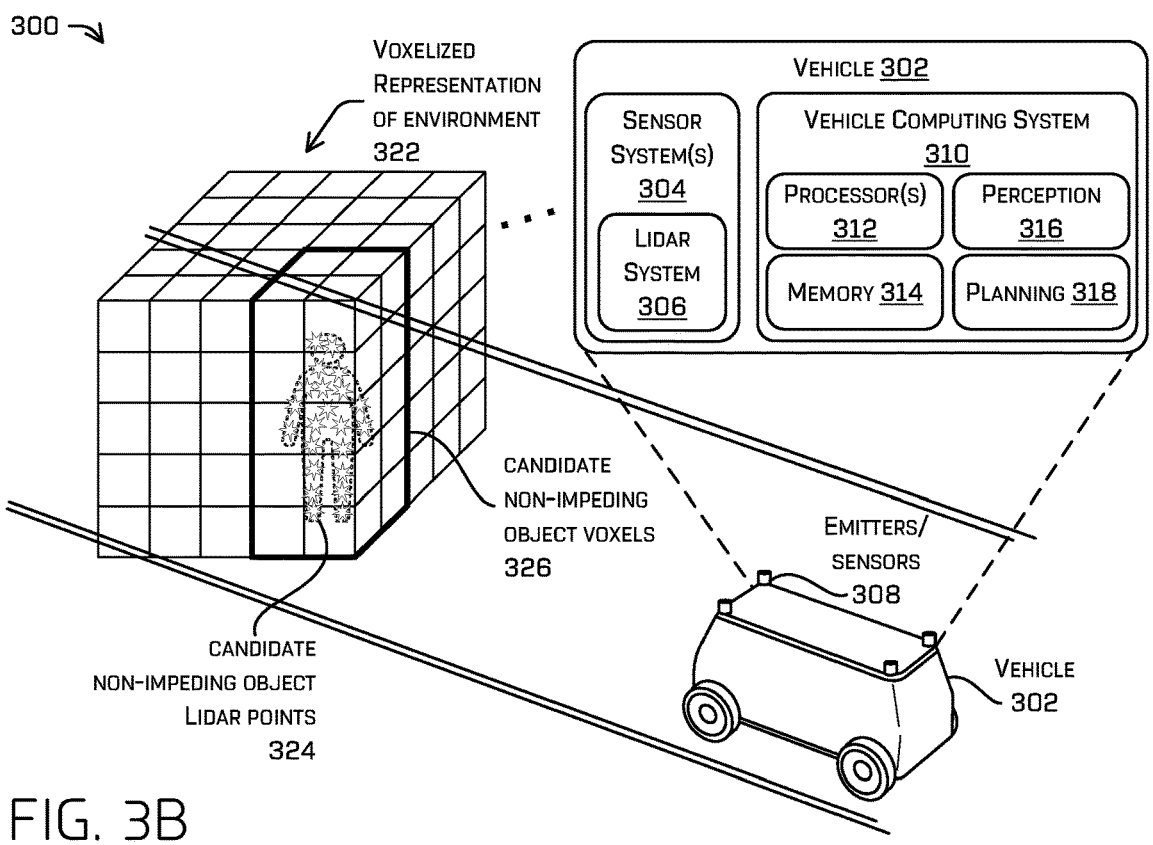
FIG. 3B is another diagram of the example environment of FIG. 3A in which the vehicle is determining voxelized lidar pulse data, in accordance with examples of the disclosure.

The vehicle computing system 310 (e.g., the perception component 316) may perform non-impeding object probability operations based on determining that the person 320 may be a non-impeding object. Referring now to FIG. 3B, the vehicle computing system 310 may determine a voxelized representation 322 of the environment 300 and the lidar points 324 that may be associated with the non-impeding object (e.g., person 320). The vehicle computing system 310 may then determine the individual lidar points of the candidate non-impeding object lidar points 324 that are associated with individual voxels of the voxelized representation 322 of the environment 300. The vehicle computing system 310 may determine the candidate non-impeding object voxels 326 that include one or more of the candidate non-impeding object lidar points 324.

For the individual voxels of the candidate non-impeding object voxels 326, the vehicle computing system 310 may determine a single aggregated value for the individual lidar data types associated with the candidate non-impeding object lidar points 324 in the individual candidate non-impeding object voxels 326. Using these aggregated values, the vehicle computing system 310 may determine the probability that the non-impeding object (e.g., person) has been properly designated as a non-impeding object. For example, the vehicle computing system 310 may determine that the person 320 does not have a sufficient probability of being a non-impeding object to maintain the non-impeding object designation for this object, and therefore may remove the designation of the person 320 as a non-impeding object, reclassify the person 320, and/or otherwise account for the person 320 in determining a trajectory for the vehicle 302 (e.g., by the planning component 318).

Figure 4:
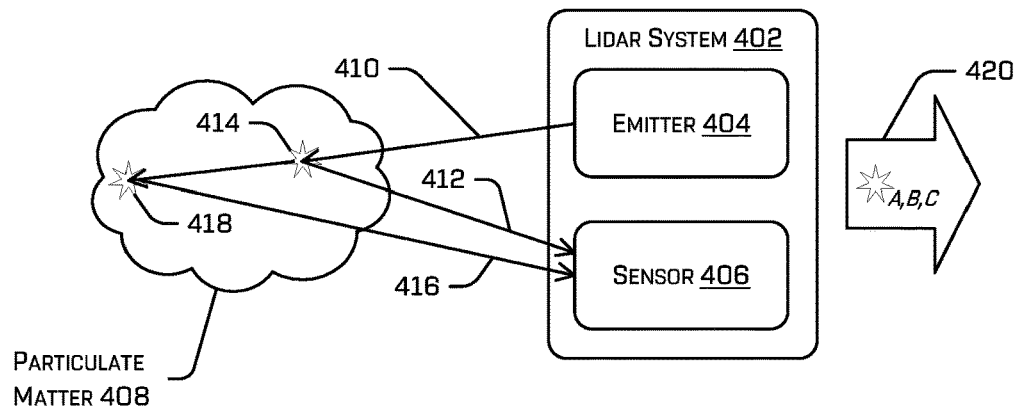
FIG. 4 is a diagram of an example environment and lidar pulses emitted and reflected in the environment, in accordance with examples of the disclosure.

FIG. 4 is a side view of an example environment 400 in which a lidar system 402 may be configured. The lidar system 402 may be any one or more sensor systems as described herein and/or a component thereof. The lidar system 402 may include one or more light emitters 404 and one or more sensors 406. A particulate matter object 408 may be located within the environment 400.

The emitter(s) 404 may emit a lidar pulse 410 into the environment 400. The pulse 410 may be partially reflected by a first portion of the object 408 (e.g., by particles in a first portion of the object 408), resulting in a return pulse 412. A lidar point 414 may be associated with the location of the reflection resulting in the return pulse 412.

Because the object 408 is a non-impeding object, the emitted lidar pulse 410, (e.g., as least a portion of the emitted lidar pulse 410) may continue through the object 408 to reflect off a second portion of the object 408 (e.g., by particles in a second portion of the object 408), resulting in a return pulse 416. A lidar point 418 may be associated with the location of the reflection resulting in the return pulse 416.

Various measurements and data may be associated with the lidar points 414 and 418 based on the return pulses 412 and 416, respectively. For example, the intensity of the return pulses 412 and 416 may be measured (e.g., at, or using, the sensor(s) 406) to determine a lidar intensity measurement for the lidar points 414 and 418, respectively. In examples, when processed using the disclosed non-impeding object probability operations, lidar points having similar and relatively low intensity may increase the probability that a non-impeding object has been correctly designated, while lidar points having similar and relatively high intensity may decrease the probability that a non-impeding object has been correctly designated.

A propagation time for the return pulses 412 and 416 may be measured by determining a length of time from the emission of the lidar pulse 410 to the receipt of the return pulses 412 and 416 at sensor(s) 406 to determine a propagation time for the lidar points 414 and 418, respectively. A distance for the return pulses 412 and 416 may also, or instead, be measured by determining a distance from the lidar system 402 to the object 408 based on the return pulses 412 and 416 (e.g., based on the respective propagation times) to determine a distance for the lidar points 414 and 418, respectively. Any one or more of such measurements, and any other measurements that may be made using return lidar pulses, may be used as described herein to determine a probability that the non-impeding object has been properly designated as a non-impeding object. For example, any one or more of a lidar point intensity, propagation, and distance may be associated with a particular lidar point and aggregated with measurements of a same type for other lidar points in a particular voxel to perform non-impeding object probability operations.

In various examples, one or more differences between data for multiple lidar points may be used in the non-impeding object probability operations described herein. For example, the difference between the propagation times associated with lidar point 414 and lidar point 418 may be determined and used in the disclosed non-impeding object probability operations. In examples, when processed using the disclosed non-impeding object probability operations, lidar points associated with return pulses that are reflections of the same emitted lidar pulse and that have relatively significantly different associated propagation times may increase the probability that a non-impeding object has been correctly designated. This is because it is more likely that the associated return pulses reflected from surfaces or portions of an object that are relatively distant from one another, and therefore require relatively significantly different amounts of time to propagate, such as portions of a particle matter object. Alternatively, lidar points associated with the same emitted lidar pulse and that have relatively similar associated propagation times may decrease the probability that a non-impeding object has been correctly designated because it is more likely that the return pulses reflected from surfaces or portions of an object that are relatively close to one another, and therefore require relatively similar amounts of time to propagate, such as surfaces of a solid object.

In examples, the difference between the distances associated with lidar point 414 and lidar point 418 may be determined and used in the disclosed non-impeding object probability operations. In examples, when processed using the disclosed non-impeding object probability operations, lidar points associated with return pulses that are reflections of the same emitted lidar pulse and that have relatively significantly different associated distances may increase the probability that a non-impeding object has been correctly designated. This is because it is more likely that the associated return pulses reflected from surfaces or portions of an object that are relatively distant from one another, such as portions of a particle matter object. Alternatively, lidar points associated with the same emitted lidar pulse and that have relatively similar associated distances may decrease the probability that a non-impeding object has been correctly designated because it is more likely that the return pulses reflected from surfaces or portions of an object that are relatively close to one another, such as surfaces of a solid object.

Various differences and other data determined based on lidar point data from one or more lidar points may be associated with the lidar points 414 and 418. For example, the propagation time difference between the propagation times associated with lidar points 414 and 418 may be associated with one or both of lidar points 414 and 418. In addition or alternatively, the distance difference between the distances associated with lidar points 414 and 418 may be associated with one or both of lidar points 414 and 418. Other determined measurements or data, such as estimated static probabilities, may be associated with one or more lidar points. Such data and measurements may be used to perform non-impeding object probability operations described herein.

Alternatively, differences and other data determined based on the lidar points 414 and 418 may be returned by the lidar system 402 as lidar point data 420 associated with a single lidar point. The lidar point data 420 may include one or more attributes that may indicate dual or multiple return pulses. For example, the lidar point data 420 may include location data for the first return pulse (e.g., location 414 associated with the first return pulse 412) and an attribute indicating a propagation time difference between the propagation times associated with lidar points 414 and 418. In addition or alternatively, the lidar point data 420 may include a distance difference between the distances associated with lidar points 414 and 418. Other determined measurements or data, such as estimated static probabilities, may be associated with the lidar point data 420. In examples where a lidar point is associated with an initial pulse that was singly reflected (e.g., not associated with dual return or multiple return pulses), the associated lidar point data may have difference data (e.g., distance difference, propagation time difference, etc.) that is zero or null, indicating that there is no second return pulse available for determining difference data, thus implicitly indicating a single return pulse associated with the lidar data point. Such data and measurements may be used to perform non-impeding object probability operations described herein.

Figure 5:
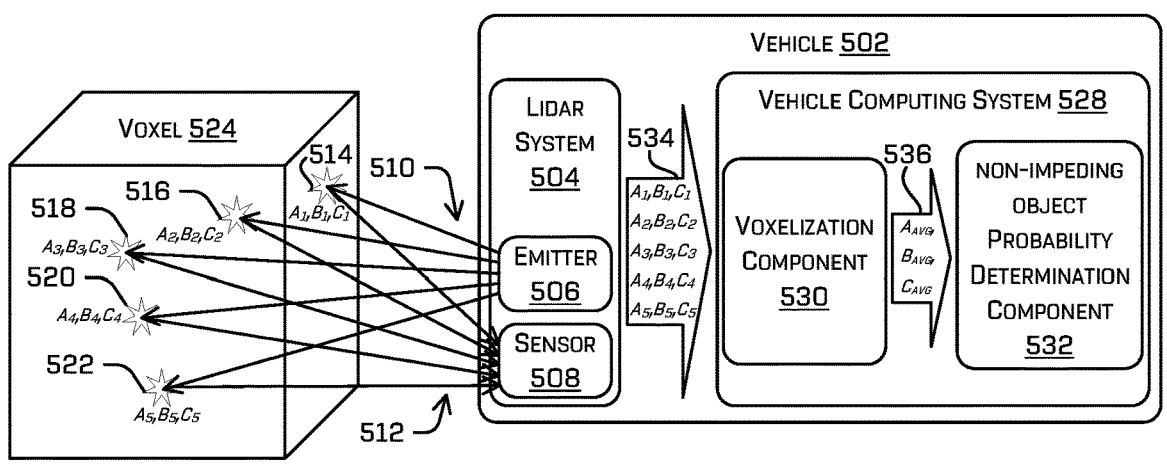
FIG. 5 is a diagram of an example environment and voxelization of lidar point data in the environment, in accordance with examples of the disclosure.

FIG. 5 is a side view of an example environment 500 in which a vehicle 502 may be configured. The vehicle 502 may be configured with a lidar system 502 that may be any one or more sensor systems as described herein and/or a component thereof. The lidar system 504 may include one or more light emitters 506 and one or more photosensors 508.

The emitter(s) 506 may emit one or more lidar pulses 510 into the environment 500. The pulses 510 may be reflect from one or more surfaces or portion of one or more objects in the environment 500, resulting in one or more return pulses 512. A lidar point may be associated with the individual return pulses of the one or more return pulses 512. In this example, individual pulses of the one or more return pulses 512 may be individually associated with lidar points 512, 516, 518, 520, and 522.

In various examples, the lidar system 504 may collect, generate, or otherwise determine lidar measurements and/or data for the lidar points 512, 516, 518, 520, and 522, for example, based on the respective associated return pulses. For example, the lidar system 504 may determine, for the individual lidar points 512, 516, 518, 520, and 522, a lidar intensity, a propagation time, a distance, an estimated static probability, multiple return time and/or distance differences, etc. Alternatively, or in addition, one or more other components of the vehicle 502, such as one or more components of the vehicle computing system 528, may determine such lidar point data. The lidar point data for the individual lidar points 512, 516, 518, 520, and 522 is represented as $a_1,b_1,c_1$; $a_2,b_2,c_2$; $a_3,b_3,c_3$; $a_4,b_4,c_4$, and $a_5,b_5,c_5$; respectively, where a, b, and c may be any type of measurement and/or data that may be associated with a lidar point.

In this example, the lidar points 512, 516, 518, 520, and 522 are located in or otherwise associated with a voxel 524 that may represent a particular section of a voxelization of the environment 500. The voxel 524 and data associated therewith may be represented as voxel data in a voxel data structure.

The vehicle 502 may be further configured with a vehicle computing system 528 that may include a voxelization component 530 and a non-impeding object probability determination component 532. The voxelization component 530 and the non-impeding object probability determination component 532 may be software components, hardware components, or a combination thereof. In examples, the voxelization component 530 and the non-impeding object probability determination component 532 represent components and/or operation that may be performed by one or more other components, such as a perception component as described herein.

The voxelization component 530 may receive lidar point data for the individual lidar points 512, 516, 518, 520, and 522 at operation 534. As shown in this figure, the voxelization component 530 may receive example lidar point data $a_1,b_1,c_1$; $a_2,b_2,c_2$; $a_3,b_3,c_3$; $a_4,b_4,c_4$; and $a_5,b_5,c_5$ for the individual lidar points 512, 516, 518, 520, and 522, respectively. In examples, the voxelization component 530 may request and/or receive lidar point data for (e.g., all) lidar points determined for a portion of an environment and may then determine the voxels with which the individual lidar points are associated. In addition or alternatively, the voxelization component 530 may request and/or receive particular lidar point data for individual lidar points determined for one or more particular voxels with which the individual lidar points are associated. In the example illustrated in the figure, the The voxelization component 530 may aggregate that lidar point data associated with the lidar points 512, 516, 518, 520, and 522 associated with the voxel 524 at operation 536. As shown in this figure, the voxelization component 530 may aggregate the example lidar point data $a_1,b_1,c_1$; $a_2,b_2,c_2$; $a_3,b_3,c_3$; $a_4,b_4,c_4$, and $a_5,b_5,c_5$ for the individual lidar points 512, 516, 518, 520, and 522, respectively to generate aggregated lidar point data $a_{avg},b_{avg},c_{avg}$. As described herein, this aggregation operation may be an averaging of the data of individual lidar point data types associated with the individual lidar points associated with the voxel. In examples, other aggregation operations (e.g., minimization, maximization) may also, or instead, be used to generate aggregated lidar point data for one or more voxels.

The aggregated lidar point data (e.g., $a_{avg},b_{avg},c_{avg}$) may be provided to (e.g., requested and/or received by) the non-impeding object probability determination component 532 for use in determining a probability that a non-impeding object designation designated for the object associated with the lidar points 512, 516, 518, 520, and 522 is accurate.

Figure 6:
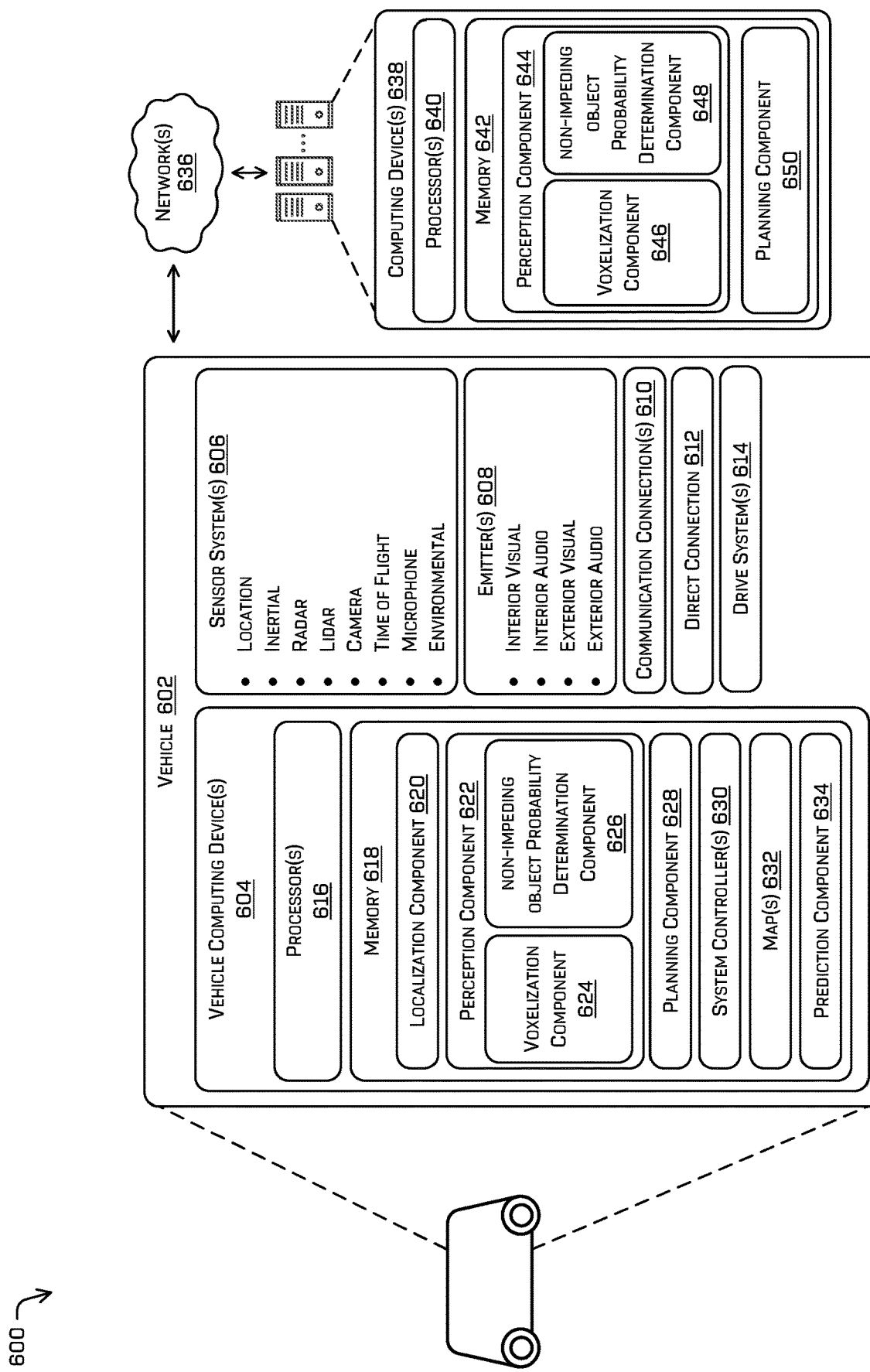
FIG. 6 is a block diagram of an example system for implementing the techniques described herein.

FIG. 6 depicts a block diagram of an example system 600 for implementing the techniques described herein. In at least one example, the system 600 can include a vehicle 602. The vehicle 602 can include a vehicle computing device 604 that may function as and/or perform the functions of a vehicle controller for the vehicle 602. The vehicle 602 can also include one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622 that may include a voxelization component 624 and/or a non-impeding object probability determination component 626 that may be configured to perform one or more of the voxelization and non-impeding object probability determination operations described herein, a planning component 628, one or more system controllers 630, one or more maps 632, and a prediction component 634. Though depicted in FIG. 6 as residing in memory 618 for illustrative purposes, it is contemplated that any one or more of the localization component 620, the perception component 622, the voxelization component 624, the non-impeding object probability determination component 626, the planning component 628, the one or more system controllers 630, the one or more maps 632, and the prediction component 634 can additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification, in addition to, or instead of, voxelization and non-impeding object probability determinations as described herein. For example, the perception component may include functionality to analyze pulse data to determine whether return pulses are likely to be multiple return pulses or single reflection return pulses, as described herein. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, traffic signal, traffic light, car light, brake light, solid object, non-impeding object, unknown). In additional or alternative examples, the perception component 622 can provide processed sensor data that indicates one or more characteristics associated with a detected entity (e.g., a tracked object) and/or the environment in which the entity is positioned. The perception component 622 may use the multichannel data structures as described herein, such as the voxel data structures generated by the described voxelization process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding object designation, etc. Such entity characteristics may be represented in a data structure as described herein (e.g., a voxel data structure generated as output of one or more voxelization operations). Characteristics associated with the environment can include, but are not limited to, a presence of another entity in the environment, a state of another entity in the environment, a time of day, a day of a week, a season, a weather condition, an indication of darkness/light, etc. In some examples, the perception component 622 can provide processed return pulse data as described herein.

In general, the planning component 628 can determine a path for the vehicle 602 to follow to traverse through an environment. In some examples, the planning component 628 can determine various routes and trajectories and various levels of detail. For example, the planning component 628 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 628 can generate an instruction for guiding the autonomous vehicle along at least a portion of the route from the first location to the second location. In at least one example, the planning component 628 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 630, which can be configured to control steering, propulsion, braking, safety, emitters, communication, and other systems of the vehicle 602. These system controller(s) 630 can communicate with and/or control corresponding systems of the drive system(s) 614 and/or other components of the vehicle 602.

The memory 618 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the maps 632. That is, the maps 632 can be used in connection with the localization component 620, the perception component 622, and/or the planning component 628 to determine a location of the vehicle 602, identify objects in an environment, and/or generate routes and/or trajectories to navigate within an environment.

In some examples, the one or more maps 632 can be stored on a remote computing device(s) (such as the computing device(s) 638) accessible via network(s) 636. In some examples, multiple maps 632 can be stored based on, for example, a characteristic (e.g., type of entity, time of day, day of week, season of the year). Storing multiple maps 632 can have similar memory requirements but increase the speed at which data in a map can be accessed.

In general, the prediction component 634 can generate predicted trajectories of objects in an environment. For example, the prediction component 634 can generate one or more predicted trajectories for vehicles, pedestrians, animals, and the like within a threshold distance from the vehicle 602. In some instances, the prediction component 634 can measure a trace of an object and generate a trajectory for the object based on observed and predicted behavior. In some examples, the prediction component 634 can use data and/or data structures based on return pulses as described herein to generate one or more predicted trajectories for various mobile objects in an environment. In some examples, the prediction component 634 may be a sub-component of perception component 622.

In some instances, aspects of some or all of the components discussed herein can include any models, algorithms, and/or machine learning algorithms. For example, in some instances, the components in the memory 618 (and the memory 642, discussed below) can be implemented as a neural network. For instance, the memory 618 may include a deep tracking network that may be configured with a convolutional neural network (CNN) that may one or more convolution/deconvolution layers.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 606 can include multiple instances of one or more of these or other types of sensors. For instance, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 636, to the one or more computing device(s) 638 at a particular frequency, after a lapse of a predetermined period of time, in near real-time, etc.

In some examples, the sensor system(s) 606 can include one or more lidar systems, such as one or more monostatic lidar systems, bistatic lidar systems, rotational lidar systems, solid state lidar systems, and/or flash lidar systems. In some examples, the sensor system(s) 606 may also, or instead, include functionality to analyze pulses and pulse data to determine whether return pulses are likely to be multipath return pulse or single reflection return pulses, as described herein.

The vehicle 602 can also include one or more emitters 608 for emitting light (visible and/or non-visible) and/or sound. The emitter(s) 608 in an example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 608 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 602 can also include one or more communication connection(s) 610 that enable communication between the vehicle 602 and one or more other local and/or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 636. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear). In at least one example, the drive system(s) 614 can include one or more sensor systems to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle 602. In some instances, the direct connection 612 can further releasably secure the drive system(s) 614 to the body of the vehicle 602.

In some examples, the vehicle 602 can send sensor data to one or more computing device(s) 638 via the network(s) 636. In some examples, the vehicle 602 can send raw sensor data to the computing device(s) 638. In other examples, the vehicle 602 can send processed sensor data and/or representations of sensor data (e.g., data representing return pulses) to the computing device(s) 638. In some examples, the vehicle 602 can send sensor data to the computing device(s) 638 at a particular frequency, after a lapse of a predetermined period of time, in near real-time, etc. In some cases, the vehicle 602 can send sensor data (raw or processed) to the computing device(s) 638 as one or more log files.

The computing device(s) 638 can include processor(s) 640 and a memory 642 storing a planning component 650 and/or a perception component 644 that may include a voxelization component 646 and/or a non-impeding object probability determination component 648 that may be configured to perform one or more of the voxelization and non-impeding object probability determination operations described herein. In some instances, the perception component 644 can substantially correspond to the perception component 622 and can include substantially similar functionality. In some instances, the planning component 650 can substantially correspond to the planning component 628 and can include substantially similar functionality.

The processor(s) 616 of the vehicle 602 and the processor(s) 640 of the computing device(s) 638 can be any suitable one or more processors capable of executing instructions to process data and perform operations as described herein. By way of example and not limitation, the processor(s) 616 and 640 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 618 and 642 are examples of non-transitory computer-readable media. The memory 618 and 642 can store an operating system and one or more software applications, instructions, programs, and/or data to implement the techniques and operations described herein and the functions attributed to the various disclosed systems. In various implementations, the memory 618 and 642 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 638 and/or components of the computing device(s) 638 can be associated with the vehicle 602. That is, the vehicle 602 can perform one or more of the functions associated with the computing device(s) 638, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data associated with an environment; receiving a non-impeding detection for an object associated with the sensor data from a machine-learned model; determining a set of the sensor data associated with the object; determining one or more voxels associated with the environment; determining one or more individual sensor data points of the set of the sensor data associated with individual voxels of the one or more voxels; determining one or more measurements associated with the one or more individual sensor data points; determining, based at least in part on the one or more measurements, one or more aggregate measurements for the individual voxels of the one or more voxels; determining, based at least in part on the one or more aggregate measurements, a probability that the object is a non-impeding object; and outputting a signal comprising an indication of the object and the probability that the object is the non-impeding object.

B: The system of paragraph A, wherein the probability is determined further based at least in part on a Bayesian inference function determined using the one or more aggregate measurements.

C: The system of paragraph A or B, wherein determining the one or more aggregate measurements comprises one or more of: averaging individual measurements associated with the one or more individual sensor data points associated with the individual voxels of the one or more voxels, maximizing individual measurements associated with the one or more individual sensor data points associated with the individual voxels of the one or more voxels, or minimizing individual measurements associated with the one or more individual sensor data points associated with the individual voxels of the one or more voxels.

D: The system of any of paragraphs A-C, wherein the measurements comprises one or more of: an intensity, a difference between a first distance associated with a first sensor data point and a second distance associated with a second sensor data point, a difference between a first propagation time associated with a first sensor data point and a second propagation time associated with a second sensor data point, a probability that the object is in motion, or a probability that the object is occluded.

E: The system of any of paragraphs A-D, wherein the operations further comprise: determining, based on the probability, that the object is the non-impeding object; and determining a vehicle trajectory based at least in part on determining that the object is the non-impeding object.

F: A method comprising: receiving a non-impeding detection from a machine-learned model for an object detected in an environment; determining sensor point data associated with a sensor point associated with the object; determining, based at least in part on the sensor point data, a probability that the object is a non-impeding object; and outputting a signal comprising an indication of the object and the probability that the object is the non-impeding object.

G: The method of paragraph F, further comprising: determining whether the probability meets a threshold; and determining a vehicle trajectory based at least in part on whether the probability meets the threshold.

H: The method of paragraph G, wherein: determining whether the probability meets the threshold comprises determining that the probability meets the threshold; and determining the vehicle trajectory comprises disregarding the object in determining the vehicle trajectory based at least in part on determining that the probability meets the threshold.

I: The method of paragraph G, wherein: determining whether the probability meets the threshold comprises determining that the probability does not meet the threshold; and determining the vehicle trajectory comprises including the object in determining the vehicle trajectory based at least in part on determining that the probability does not meet the threshold.

J: The method of any of paragraphs F-I, wherein: determining the sensor point data comprises determining a first attribute of the sensor point and a second attribute of the sensor point; determining the probability comprises: determining a first probability based at least in part on the first attribute; determining a second probability based at least in part on the second attribute; and determining the probability further based at least in part on the first probability and the second probability.

K: The method of paragraph J, wherein determining the probability further based at least in part on the first probability and the second probability comprises determining the probability further based at least in part on whether the first probability meets a first threshold and whether the second probability meets a second threshold.

L: The method of paragraph K, further comprising: determining one or more of the first probability does not meet the first threshold or the second probability does not meet the second threshold; and based at least in part on determining that first probability does not meet the first threshold or the second probability does not meet the second threshold, determining that the object is not the non-impeding object.

M: The method of any of paragraphs F-L, further comprising disassociating the non-impeding detection from the object based at least in part on the probability that the object is the non-impeding object.

N: The method of any of paragraphs F-M, wherein the object comprises one or more of fine particulate matter and a gas.

O: One or more non-transitory computer-readable media storing instructions that, when executed by one or more processors, perform operations comprising: receiving object data for an object detected in an environment from a machine-learned model, the object data comprising a non-impeding detection associated with the object; determining sensor point data associated with a sensor point associated with the object; determining, based at least in part on the sensor point data, a probability that the object is a non-impeding object; and outputting a signal comprising an indication of the object and the probability that the object is the non-impeding object.

P: The one or more non-transitory computer-readable media of paragraph O, wherein the sensor point data comprises an indication of a difference between a first propagation time associated with a first return pulse associated with the sensor point and a second propagation time associated with a second return pulse associated with the sensor point.

Q: The one or more non-transitory computer-readable media of paragraph O or P, wherein the sensor point data comprises an indication of a difference between a distance to the object associated with a first return pulse associated with the sensor point and a second distance to the object associated with a second return pulse associated with the sensor point.

R: The one or more non-transitory computer-readable media of any of paragraphs O-Q wherein: determining the sensor point data comprises determining a first attribute of the sensor point and a second attribute of the sensor point; determining the probability comprises: determining a first conditional probability based at least in part on the first attribute; determining a second conditional probability based at least in part on the second attribute; and determining the probability further based at least in part on the first conditional probability and the second conditional probability.

S: The one or more non-transitory computer-readable media of paragraph R, wherein at least one of the first attribute and the second attribute is associated with multiple return pulses associated with the sensor point.

T: The one or more non-transitory computer-readable media of paragraph R, wherein the first conditional probability is determined further based at least in part on a look-up table comprising attribute values and probability values.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving sensor data associated with an environment;
   receiving a non-impeding detection for an object associated with the sensor data from a machine-learned model;
   determining a set of the sensor data associated with the object;
   determining one or more voxels associated with the environment;
   determining one or more individual sensor data points of the set of the sensor data associated with individual voxels of the one or more voxels;
   determining one or more lidar intensity measurements associated with the one or more individual sensor data points;
   determining, based at least in part on the one or more lidar intensity measurements, one or more aggregate lidar intensity measurements for the individual voxels of the one or more voxels by averaging individual lidar intensity measurements associated with the one or more individual sensor data points to generate averaged lidar intensity measurements;
   executing a natural logarithmic function using the averaged lidar intensity measurements as input to generate, as output, a probability that the object is a non-impeding object; and
   controlling a vehicle based at least in part on a signal comprising an indication of the object and the probability that the object is the non-impeding object.

2. The system of claim 1, wherein controlling the vehicle comprises disregarding the object in controlling the vehicle based at least in part on determining that the probability meets a threshold.

3. The system of claim 1, wherein determining the one or more aggregate lidar intensity measurements comprises one or more of:
   maximizing individual lidar intensity measurements associated with the one or more individual sensor data points associated with the individual voxels of the one or more voxels, or
   minimizing individual lidar intensity measurements associated with the one or more individual sensor data points associated with the individual voxels of the one or more voxels.

4. The system of claim 1, wherein the operations further comprise:
   determining one or more additional measurements based on one or more of:
   an intensity,
   a difference between a first distance associated with a first sensor data point and a second distance associated with a second sensor data point,
   a difference between a first propagation time associated with a first sensor data point and a second propagation time associated with a second sensor data point,
   a probability that the object is in motion, or
   a probability that the object is occluded; and
   determining the probability further based at least in part on the one or more additional measurements.

5. The system of claim 1, wherein the natural logarithmic function comprises a Bayesian inference function.

6. A method comprising:
   receiving a non-impeding detection from a machine-learned model for an object detected in an environment;
   determining a set of sensor data associated with the object;
   determining one or more lidar intensity measurements associated with one or more individual sensor data points of the set of sensor data;
   averaging individual lidar intensity measurements associated with the one or more individual sensor data points to generate averaged lidar intensity measurements;
   determining, based at least in part on executing a natural logarithmic function using the averaged lidar intensity measurements, a probability that the object is a non-impeding object; and
   controlling a vehicle based at least in part on a signal comprising an indication of the object and the probability that the object is the non-impeding object.

7. The method of claim 6, further comprising:
   determining whether the probability meets a threshold; and
   determining a vehicle trajectory based at least in part on whether the probability meets the threshold.

8. The method of claim 7, wherein:
   determining whether the probability meets the threshold comprises determining that the probability meets the threshold; and
   determining the vehicle trajectory comprises disregarding the object in determining the vehicle trajectory based at least in part on determining that the probability meets the threshold.

9. The method of claim 7, wherein:
   determining whether the probability meets the threshold comprises determining that the probability does not meet the threshold; and determining the vehicle trajectory comprises including the object in determining the vehicle trajectory based at least in part on determining that the probability does not meet the threshold.

10. The method of claim 6, wherein:
determining the set of sensor data comprises determining a first attribute of a sensor data point of the set of sensor data and a second attribute of the sensor data point; and
determining the probability comprises:
determining a first probability based at least in part on the first attribute;
determining a second probability based at least in part on the second attribute; and
determining the probability further based at least in part on the first probability and the second probability.

11. The method of claim 10, wherein determining the probability further based at least in part on the first probability and the second probability comprises determining the probability further based at least in part on whether the first probability meets a first threshold and whether the second probability meets a second threshold.

12. The method of claim 11, further comprising:
determining one or more of the first probability does not meet the first threshold or the second probability does not meet the second threshold; and
based at least in part on determining that the first probability does not meet the first threshold or the second probability does not meet the second threshold, determining that the object is not the non-impeding object.

13. The method of claim 6, further comprising disassociating the non-impeding detection from the object based at least in part on the probability that the object is the non-impeding object.

14. The method of claim 6, wherein the object comprises one or more of fine particulate matter or a gas.

15. One or more non-transitory computer-readable media storing instructions that, when executed by one or more processors, perform operations comprising:
receiving object data for an object detected in an environment from a machine-learned model, the object data comprising a non-impeding detection associated with the object;
determining a set of sensor data associated with the object;
determining one or more lidar intensity measurements associated with one or more individual sensor data points of the set of sensor data;
averaging individual lidar intensity measurements associated with the one or more individual sensor data points to generate averaged lidar intensity measurements;
determining, based at least in part on executing a natural logarithmic function using the averaged lidar intensity measurements, a probability that the object is a non-impeding object; and
controlling a vehicle based at least in part on a signal comprising an indication of the object and the probability that the object is the non-impeding object.

16. The one or more non-transitory computer-readable media of claim 15, wherein the set of sensor data comprises an indication of a difference between a first propagation time associated with a first return pulse associated with a sensor data point of the set of sensor data and a second propagation time associated with a second return pulse associated with the sensor data point.

17. The one or more non-transitory computer-readable media of claim 15, wherein the set of sensor data comprises an indication of a difference between a distance to the object associated with a first return pulse associated with a sensor data point of the set of sensor data and a second distance to the object associated with a second return pulse associated with the sensor data point.

18. The one or more non-transitory computer-readable media of claim 15, wherein:
determining the set of sensor data comprises determining a first attribute of a sensor data point of the set of sensor data and a second attribute of the sensor data point; and
determining the probability comprises:
determining a first conditional probability based at least in part on the first attribute;
determining a second conditional probability based at least in part on the second attribute; and
determining the probability further based at least in part on the first conditional probability and the second conditional probability.

19. The one or more non-transitory computer-readable media of claim 18, wherein at least one of the first attribute and the second attribute is associated with multiple return pulses associated with the sensor data point.

20. The one or more non-transitory computer-readable media of claim 18, wherein the first conditional probability is determined further based at least in part on a look-up table comprising attribute values and probability values.

* * * * *